(12) United States Patent
Frei et al.

(10) Patent No.: US 12,179,287 B2
(45) Date of Patent: Dec. 31, 2024

(54) METHOD FOR THE MATERIAL-REMOVING LASER MACHINING OF A WORKPIECE (71) Applicant: WALTER MASCHINENBAU GMBH, Tuebingen (DE)

(72) Inventors: Bruno Frei, Thierachern (CH); Claus Dold, Zürich (CH); Maximilian Warhanek, Zürich (CH)

(73) Assignee: WALTER MASCHINENBAU GMBH, Tuebingen (DE)

( * ) Notice: Subject to any disclaimer, the term of this patent is extended or adjusted under 35 U.S.C. 154(b) by 775 days.

(21) Appl. No.: 17/285,688

(22) PCT Filed: Oct. 9, 2019

(86) PCT No.: PCT/EP2019/077284
§ 371 (c)(1),
(2) Date: Apr. 15, 2021

(87) PCT Pub. No.: WO2020/078782
PCT Pub. Date: Apr. 23, 2020

(65) Prior Publication Data
US 2021/0402520 A1 Dec. 30, 2021

(30) Foreign Application Priority Data
Oct. 15, 2018 (DE) ...................... 10 2018 125 436.9

(51) Int. Cl.
*B23K 26/36* (2014.01)
*B23K 26/08* (2014.01)

(52) U.S. Cl.
CPC .............. *B23K 26/36* (2013.01); *B23K 26/08* (2013.01)

(58) Field of Classification Search
None
See application file for complete search history.

(56) References Cited

U.S. PATENT DOCUMENTS 5,239,160 A * 8/1993 Sakura ............... B23K 26/0884
269/71
5,624,585 A * 4/1997 Haruta .................. B23K 26/26
219/121.74

(Continued)

FOREIGN PATENT DOCUMENTS

CN 1678426 A 10/2005
CN 1828834 A 9/2006

(Continued)

OTHER PUBLICATIONS

Machine translation of JP 04162975-A (Year: 2024).*

(Continued)

*Primary Examiner* — Geoffrey S Evans
(74) *Attorney, Agent, or Firm* — CANTOR COLBURN LLP (57) ABSTRACT

A method for the material-removing machining of a workpiece by laser beam pulses. The laser beam pulses are directed to impact points on the surface of a volume to be removed of the workpiece in order to cut away material from the volume to be removed. Cutting away the volume to be removed results in a new contour surface to be produced on the workpiece. An impact angle of the laser beam pulses relative to the contour surface to be produced is set in accordance with a predefined condition during the removal of at least part of the volume to be removed that directly adjoins the contour surface to be produced. According to this condition, the impact angle is the same as a threshold angle (as), or somewhat smaller.

20 Claims, 5 Drawing Sheets

(56) References Cited

U.S. PATENT DOCUMENTS

| | | | |
|---|---|---|---|
| 5,656,186 A * | 8/1997 | Mourou | B23K 26/53 |
| | | | 219/121.69 |
| 5,911,890 A | 6/1999 | Dulaney et al. | |
| 6,129,723 A | 10/2000 | Anderson et al. | |
| 8,872,065 B2 | 10/2014 | Pluss | |
| 8,969,758 B2 | 3/2015 | Brunner et al. | |
| 10,137,717 B2 | 11/2018 | Wei et al. | |
| 10,376,992 B2 | 8/2019 | Hildebrand et al. | |
| 10,695,869 B2 | 6/2020 | Pluss et al. | |
| 2001/0031960 A1 * | 10/2001 | Kliewer | B23K 26/073 |
| | | | 606/5 |
| 2002/0000428 A1 | 1/2002 | Dulaney et al. | |
| 2011/0108533 A1 * | 5/2011 | Boettcher | B23K 26/1476 |
| | | | 219/121.72 |
| 2011/0220625 A1 * | 9/2011 | Pluss | B23K 26/0823 |
| | | | 219/121.72 |
| 2014/0263212 A1 | 9/2014 | Zhang | |
| 2015/0258632 A1 * | 9/2015 | Pluess | B23K 26/38 |
| | | | 219/121.72 |
| 2016/0193698 A1 | 7/2016 | Hildebrand et al. | |
| 2017/0113304 A1 | 4/2017 | Pluss et al. | |
| 2020/0407819 A1 | 12/2020 | Zhang et al. | |

FOREIGN PATENT DOCUMENTS

| | | | |
|---|---|---|---|
| CN | 1908807 A | 2/2007 | |
| CN | 104191825 A | 12/2014 | |
| CN | 104733339 A | 6/2015 | |
| CN | 106715033 A | 5/2017 | |
| DE | 102009044316 A1 | 5/2011 | |
| DE | 102010011508 A1 | 9/2011 | |
| DE | 102015009622 A1 | 2/2017 | |
| JP | 04162975 A * | 6/1992 | B23K 26/083 |
| JP | 2005197544 A | 7/2005 | |
| JP | 2015213952 A | 12/2015 | |
| WO | 2004020140 A1 | 3/2004 | |
| WO | 2013110384 A2 | 8/2013 | |
| WO | 2016005133 A | 1/2016 | |

OTHER PUBLICATIONS

CN First Search for corresponding CN Application No. 2019800676763, 1 Page, Issued Jul. 21, 2022 (No Machine Translation).
CNIPA Office Action for corresponding CN Application No. 2019800676763.3, 9 Pages, Issued Jul. 29, 2022, (No Machine Translation).
Decision to Grant dated Jun. 1, 2023; Chinese Application No. 201980067676.3; 4 pages (non-English).
Decision to Grant dated Jun. 1, 2023; Chinese Application No. 201980067676.3; 2 pages (English).
International Search Report for Application No. PCT/EP2019/077284.
English Translation to International Search Report for Application No. PCT/EP2019/077284.
Written Opinion for Application No. PCT/EP2019/077284.
First German Office Action for Application No. 10 2018 125 436.9.
Second German Office Action for Application No. 10 2018 125 436.9.
Office Action dated Mar. 7, 2023; Chinese Application No. 201980067676.3; 16 pages (non-English).
Office Action dated Mar. 7, 2023; Chinese Application No. 201980067676.3; 8 pages (English translation).
Office Action dated Jun. 16, 2023; German Application No. 102018125436.9; 10 pages (non-English).

* cited by examiner

METHOD FOR THE MATERIAL-REMOVING LASER MACHINING OF A WORKPIECE

CROSS REFERENCE TO RELATED APPLICATIONS

This application is a National Stage of PCT Application No. PCT/EP2019/077284 filed on Oct. 9, 2019, which claims priority to German Patent Application No. 10 2018 125 436.9 filed on Oct. 15, 2018, the contents each of which are incorporated herein by reference thereto.

BACKGROUND

The invention refers to a method for material removing laser machining of a workpiece. A new contour surface shall be created at the workpiece by the material removal.

Such a method is, for example, known from DE 10 2010 011 508 A1. Due to the machining of the workpiece, a rotary tool is manufactured. By means of a deflection device or a laser scanner laser beam impulses of the laser are directed along a pulse path on impact locations on the workpiece. Superimposed to this a relative movement between the laser head and the workpiece occurs. The material can be removed in layers due to this superimposed movement and a contour surface can be exposed.

WO 2016/005133 A1 describes a method for creation of a contour surface on a rod-like workpiece. Particularly rotary tools shall be produced with this method. For this, for example, grooves can be introduced in the rod-like workpiece in that material is removed by means of a laser and the groove is created. Thereby laser beam impulses are orientated tangential to the groove surfaces and thus impact on a surface section that is substantially orientated radial to the longitudinal axis of the rod-shaped workpiece to remove material there.

The tangential orientation of the laser beam impulses relative to the contour surface that has to be created has been proven. The invention is based on the object to improve the method in order to achieve a high accuracy of the created contour surface with high efficiency.

BRIEF SUMMARY

A method for material removal laser machining of a workpiece under use of a laser processing machine having a laser creating laser beam impulses, having a laser head that directs the laser beam impulses of the laser on the workpiece and having a machine axis arrangement comprising at least one machine axis that is configured to position and/or move the workpiece and the laser head in at least one translatory and/or rotatory degree of freedom relative to each other, comprising the following steps: emitting multiple laser beam impulses by means of the laser head on a surface of a volume to be removed of the workpiece, wherein material is removed from the volume to be removed of the workpiece and thus a contour surface to be created is created on the workpiece, adjusting an impact angle of the laser beam impulses relative to the contour surface to be created at a border location at which the contour surface to be created directly adjoins the volume to be removed such that the impact angle is at most as large as a threshold angle and is at least as large as a minimum angle, wherein the minimum angle is larger than 0 degrees and the threshold angle is equal to the amount of the impact angle at which an effective laser energy density at an impact location of the laser beam impulse on the contour surface to be created of the workpiece corresponds to a threshold fluence, wherein an effective laser energy density that is larger than the threshold fluence effectuates a material removal at the impact location and an effective laser energy density that is smaller than the threshold fluence does not effectuate material removal at the impact location.

The inventive method uses a laser processing machine in order to remove material from a workpiece and thus to create a contour surface on the workpiece. The workpiece can have an arbitrary geometry. The contour surface to be created can completely or partly extend in a plane. The contour surface to be created can also be curved completely or in sections in a concave or a convex manner.

The laser processing machine is configured to create laser beam impulses. The laser beam impulses created by a laser are directed on the workpiece by a laser head. The laser head can comprise, for example, a deflection device or a scanner in order to direct the laser beam impulses on impact locations on the surface of the workpiece. The machine axis arrangement of the laser processing machine is configured to position and/or move and/or orientate the workpiece and the laser head relative to each other in at least one translatory and/or rotatory degree of freedom.

In the method the created laser beam impulses are directed on the surface of a volume at the workpiece that is to be removed by means of the laser head. Thereby material is removed from the volume to be removed and contour surface to be created is formed directly adjacent to the volume to be removed bit by bit. As soon as the volume to be removed is completely removed, the contour surface is thereby created. The contour surface is exposed, so-to-speak, by removal of the volume to be removed.

During the removal of the material an impact angle of the laser beam impulses is adjusted according to a predefined condition at least for the part of the volume to be removed that directly adjoins the contour surface to be created. According to this condition, the impact angle is at most as large as a threshold angle and at least as large as a predefined minimum angle. The minimum angle is larger than 0 degrees. The amount of the difference between the threshold angle and the minimum angle is particularly smaller than the amount of the minimum angle. Preferably the impact angle is open-loop or closed-loop controlled such that it is equal to the threshold angle.

The impact angle is measured between a center axis of the laser beam impulses that can corresponds to an optical axis of the laser head and the contour surface to be created. The impact angle is the complimentary angle to the angle of incidence of the laser beam impulses that is defined by the surface normal at the impact point of the laser beam impulses on the contour surface to be created and the center axis of the laser beam impulses. If the contour surface to be created is curved at the border location directly adjacent to the surface of the volume to be removed, the impact angle is defined between a tangent placed on the border location of the contour surface to be created and the main axis of the laser beam impulse. Thereby the tangent placed on the contour surface extends in a radial plane relative to the main axis of the laser beam impulse that extends orthogonal to the contour surface to be created at the border location.

Thereby the threshold angle is defined as amount of the impact angle having an effective laser energy density of the laser beam impulse at the impact location on the contour surface to be created directly adjacent to the adjoining part of the volume to be removed that corresponds to a threshold fluence. The effective laser energy density corresponds to the percentage of the laser energy density that can be coupled into the material to be machined. The threshold fluence forms a threshold for the effective laser energy density. If the effective laser energy density is larger than the threshold fluence, material is removed at the impact location at the contour surface to be created. If the effective laser energy density is smaller than the threshold fluence, no material removal occurs at the impact location at the contour surface.

The effective laser energy density is defined as a pulse energy of the emitted laser beam impulse that is absorbed by the irradiated surface divided through the surface irradiated by the laser beam impulse at the impact location of the contour surface. The effective laser energy density at the impact location is equal to the threshold fluence at the threshold angle.

By guidance of the laser beam impulses, such that the impact angle is at most as large or equal to the threshold angle, no material removal occurs, if the laser beam impulse impacts on the adjoining part of the contour surface to be created adjacent to the volume to be removed. The desired geometry of the contour surface to be created at the border location that directly adjoins the actual surface or uppermost layer of the volume to be removed can thus be used as parameter for determination of the actual impact angle. If the laser beam impulse impacts adjacent to the surface of the volume to be removed on the contour surface that is to be created or that has already been created, no undesired material removal occurs there. Due to the selected impact angle, the effective laser energy density is insufficient in order to remove the contour surface to be created or that has been created and thus to effectuate a deviation from the desired geometry. However, volume elements of the volume that has to be removed that extend away from the desired geometry of the contour surface are removed, because the laser beam impulse comprises a larger impact angle and thus a sufficiently large laser energy density, if it impacts on such volume elements.

If the impact angle is guided close below or equal to the threshold angle, a self-adjusting method is created so-to-speak in which the laser beam impulses create the predefined desired geometry of the contour surface to be created. Because the impact angle never exceeds the threshold angle, in no case more volume is removed than predefined, which would lead to irreparable fault in the desired geometry of the contour surface to be created.

If the contour surface to be created extends in a plane, the threshold angle or the impact angle during material removal adjacent to the contour surface to be created always has the same amount. If the contour surface to be created is curved, a tangent is placed onto the border at which the contour surface to be created transitions in the surface of the volume to be removed, as described above, and the impact angle is determined and adjusted at this actual machining point at the border of the contour surface to be created. The impact angle can thus also be larger than the threshold angle relative to other locations on the contour surface that are arranged with distance to the actual surface of the volume to be removed. The impact angle at the actual border location of the contour surface to be created that adjoins the layer on which material is actually removed from the volume to be removed is of importance for the method.

Preferably the adjustment of the impact angle can be carried out by positioning and/or orientating the workpiece and the laser head relative to each other. The machine axis arrangement can be used for this purpose.

It is in addition preferred that the laser energy density of the laser beam impulses within a focus area is always larger than the threshold fluence during laser machining. The laser energy density is thereby defined as pulse energy of the laser beam impulses divided through a cross-section area orthogonal to the center axis of the laser beam impulses within the focus area. A variation of the pulse energy of the laser beam impulses during the machining of the workpiece is not necessary. Due to the adjustment of the impact angle, material is removed at the volume to be removed and concurrently the material that corresponds to the contour to be created is maintained.

The focus area of the laser beam impulses is defined by the area in which the cross-section area of the laser beam doubles relative to the smallest cross-section area in the focus.

Preferably the laser beam impulses are directed on impact locations that are arranged within a pulse area that is defined by a control device. The pulse area can have an arbitrary contour and can be, for example, at least in sections polygonal and/or curved. The size and the contour of the pulse area can be adapted to the processing task. Within the pulse area subsequent laser beam impulses are directed on a defined impact location respectively. By means of the machine axis a relative movement between the laser head and the workpiece can be created such that the pulse area moves along the surface of the volume to be removed so-to-speak. The velocity with which the laser beam impulses move within the pulse area from impact location to impact location is at least about the factor 10 or 20 higher than the adjustment velocity that is adjusted by the machine axis arrangement during laser machining. The pulse area can thus be considered as virtual tool having a contour corresponding to the pulse area and that is moved along the surface by means of the machine axes. The pulse area is preferably two-dimensional, such that impact locations are distributed in two spatial directions within the pulse area.

The size and the shape of such a pulse area and/or the position of the impact locations within the pulse area can be defined depending on one or more parameters of the workpiece and/or the contour surface to be created. For example, the material of the workpiece, the geometry of the workpiece or the contour surface to be created, a required predefined roughness of the contour surface to be created, etc. can be used as parameter.

In an embodiment of the method it is advantageous, if the outer contour and/or the sequence or position of the impact locations within the pulse area is varied depending on the actual relative position and/or relative orientation of the workpiece relative to the laser head. In doing so, the pulse area and the material removal within the pulse area can be adapted to the geometry of the contour surface to be created or the workpiece. Such a variation or adaption can be carried out in steps or continuously. This variation or adaption can be controlled synchronously or asynchronously to the movement of the machine axes.

The impulse duration of the laser beam impulses can be in the nanosecond range, the picosecond range or the femtosecond range.

The method is preferably used for creation of a tool made from the workpiece. Particularly the contour surface to be created can adjoin a cutting edge and can form a rake face or a flank, for example.

Advantageous embodiments of the method are derived from the dependent claims, the description and the drawings. In the following preferred embodiments of the method are explained in detail based on the attached drawings.

BRIEF DESCRIPTION OF THE DRAWINGS

FIG. 1 a schematic illustration of an embodiment of a laser processing machine that is configured for carrying out an inventive method, FIG. 2 a schematic perspective illustration of a workpiece during the creation of a contour surface, FIGS. 3-5 schematic only exemplary illustrations of different embodiments of pulse areas respectively, FIGS. 6 and 7 a schematic side view of a workpiece in different conditions during the creation of a contour surface respectively by removal of a volume to be removed from the workpiece, FIG. 8 an enlarged basic illustration for explanation of the adjustment of the impact angle of the laser beam impulses relative to the contour surface to be created, FIG. 9 another basic sketch for explaining the adjustment of the impact angle relative to the contour surface at a border location in case of a curve extension of the contour surface to be created and FIG. 10 a schematic perspective partial illustration of the workpiece in the area of a border between a contour surface to be created and a surface of a volume to be removed for illustration of the effective laser energy density and the laser energy density.

DETAILED DESCRIPTION

Figure 1:
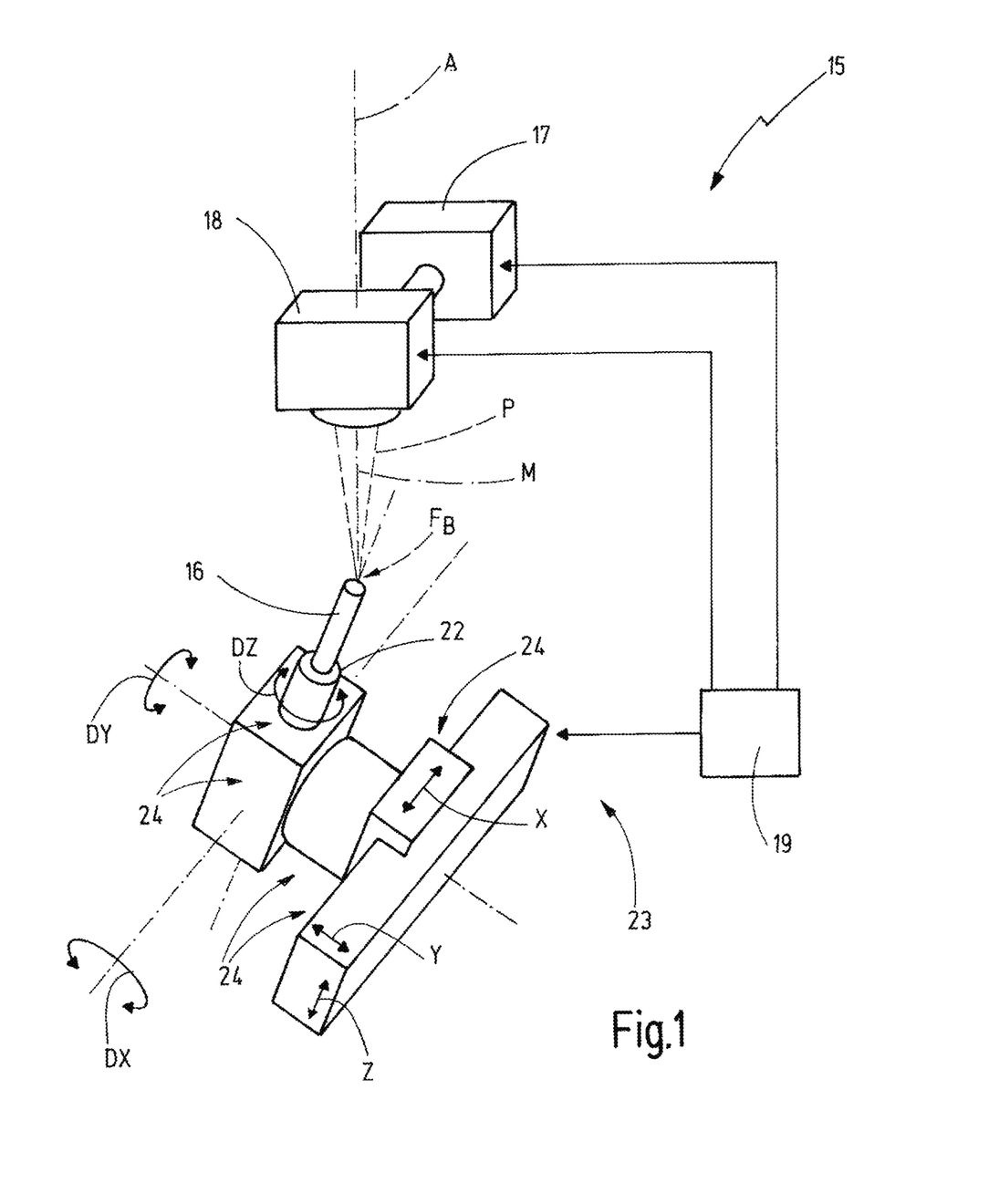

FIG. 1 shows a perspective basic illustration of a laser processing machine 15 that is configured to carry out a method for material removing laser machining of a workpiece 16 according to the invention. The workpiece 16 can have an arbitrary outer shape and is in the embodiments according to FIGS. 1 and 2 cylindrical and preferably circular cylindrical. Also arbitrary other plate-shaped, cuboid-shaped or other shapes and contours of workpieces 16 can be machined.

The laser processing machine 15 has a pulsed laser 17 that creates a pulsed laser beam and thus laser beam impulses P. The pulsed laser beam is transmitted from the laser 17 to a laser head 18. The laser head 18 is configured to emit the laser beam impulses P relative to its optical axis A in a predefined direction and to focus them in a focus area $F_B$. During the machining of the workpiece 16 a layer of a volume V of the workpiece 16 to be removed that is actually machined, i.e. the material removal location or the material removal layer, is placed within the focus area $F_B$.

The laser head 18 can have focusing means such as optical lenses or the like. Thereby the laser beam impulse P obtains a divergence angle and is focused in the focus area $F_B$. The divergence angle in the far field is the aperture angle of the laser beam impulse from the focusing means of the laser head 18 up to the focal point of focus within the focus area $F_B$.

In addition the laser head 18 has a deflection device that can also be described as laser scanner. The deflection device can comprise one or more movable deflection mirrors and can be configured to adjust the emission direction, i.e. the orientation of a center axis M of a laser beam impulse P relative to the optical axis A.

A control device 19 of the laser processing machine 15 is configured to control the laser 17 (pulse energy, impulse duration of the laser beam impulses P) and the laser head 18 and particularly the deflection device of the laser head 18 in an open-loop or closed-loop manner.

The laser processing machine 15 comprises a clamping device 22 adapted to the shape of the workpiece 16 for holding the workpiece 16. In the embodiment shown in FIG. 1 the clamping device 22 is configured to clamp a rod-shaped workpiece 16 on one end. Depending on the shape of the workpiece, suitable clamping devices can be used respectively.

The laser processing machine 15 has in addition a machine axis arrangement 23. The machine axis arrangement 23 is configured to move, to position and orientate the clamping device 22 and thus the workpiece 16 relative to the laser head 18. The machine axis arrangement 23 is controlled by the control device 19.

The machine axis arrangement 23 comprises at least one and according to the example multiple machine axes 24, wherein each machine axis 24 is configured to provide a relative movement between the clamping device 22 and the laser head 18 in a translatory or rotatory degree of freedom. Thereby a machine axis 24 can be configured for movement of the laser head 18 or for movement of the clamping device 22 relative to a machine basis or a machine frame. The arrangement of the machine axes 24 as well as the number of machine axes for movement in a translatory or rotatory degree of freedom can vary. For example, six machine axes 24 can be provided for the translatory degrees of freedom X, Y, Z as well as the rotatory degrees of freedom DX, DY, DZ in total. The machine axis arrangement 23 with the machine axes 24 is only highly schematically illustrated in FIG. 1.

Figure 3:
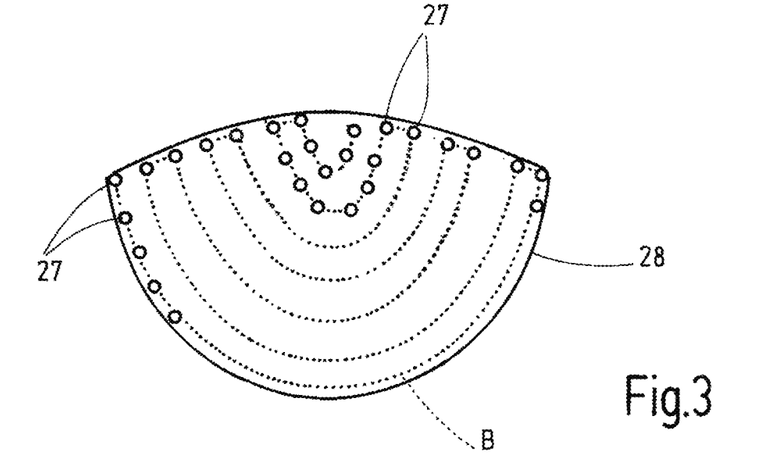
Figure 4:
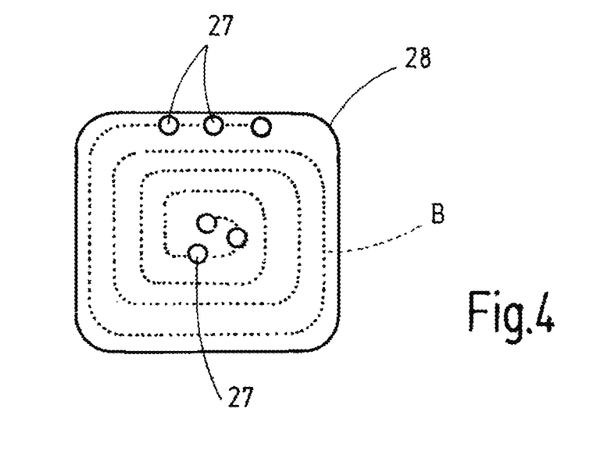
Figure 5:
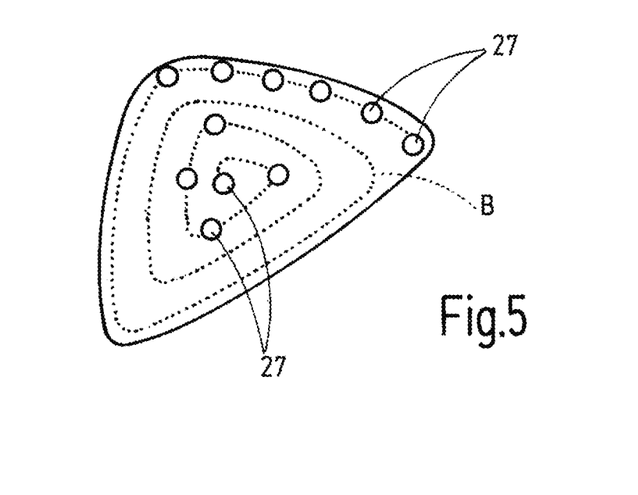

The laser head 18 or its deflection device is controlled by means of the control device 19 in a manner such that the emitted laser beam impulses P are directed in a predefined sequence on impact locations 27 within a pulse area 28. If no relative movement between the laser head 18 and the clamping device 22 is created by the machine axis arrangement 23, the laser beam impulses P would be sequentially directed on the impact locations 27 within the pulse area 28 on the workpiece surface. The shape and contour of the pulse area 28 is adapted to the machining task and can be defined and adjusted based on a geometry of a contour surface 29 to be created and/or a geometry of the workpiece 16, for example. In FIGS. 3-5 different sizes and shapes for pulse areas 28 are illustrated in a simplified manner. Within the pulse area 28 some impact locations are respectively highly schematically illustrated along a pulse path B within the pulse area 28. For example, the impact locations 27 can be arranged on a meandering pulse path B (FIG. 3) or on a pulse path B extending in a spiral form (FIGS. 4 and 5). The contour and size of the pulse area 28 is obtained by the smallest possible circumferential contour around the outermost impact locations that adjoin the circumferential contour of the pulse area 28.

Figure 2:
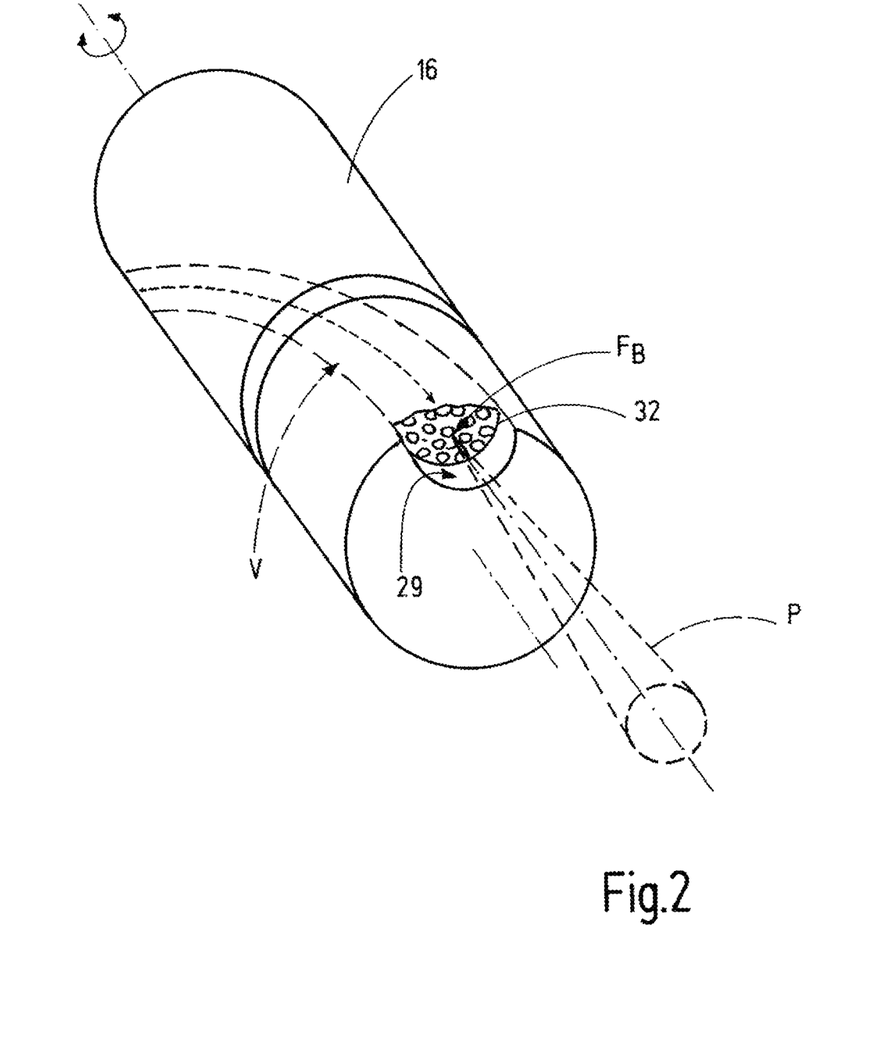

The circumferential contour or the outer shape of the pulse area 28 can correspond to the cross-section shape of a groove to be created, for example, that is limited by the contour surface 29 to be created (FIG. 2). Alternatively, the pulse area 28 can also be smaller than the surface of the volume V to be removed and can be moved along the surface of the volume V to be removed by means of the machine axis arrangement 23 in order to remove the material bit by bit in a manner layer by layer.

The contour surface 29 to be created can limit a chip groove as illustrated in FIG. 2. The contour surface 29 to be created can also be any other arbitrary surface that is created on the workpiece 16. In the embodiments described here the contour surface 29 to be created forms preferably a surface adjoining a cutting edge 30 that can be a rake surface or a flank.

For manufacturing the contour surface 29 the laser processing machine 15 is operated by means of the control device 19 in a manner as explained in the following.

Figure 6:
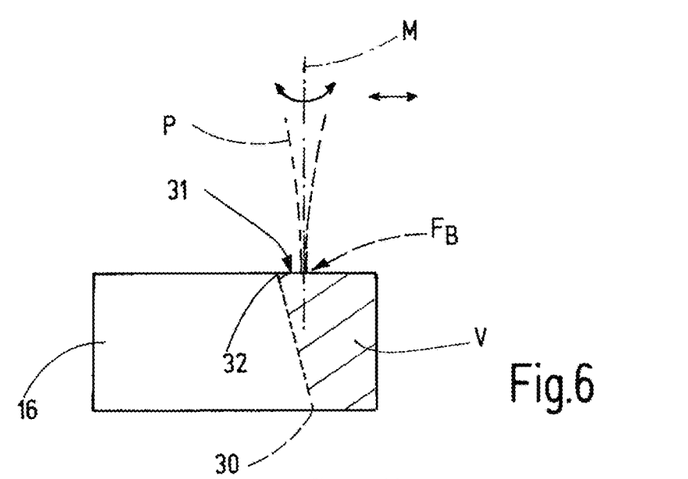
Figure 7:
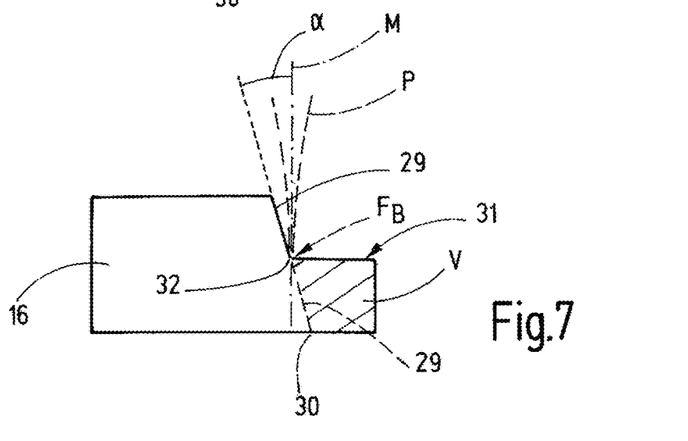

Laser beam impulses P are directed on a surface 31 of the volume V to be removed by means of the laser 17 and the laser head 18 in order to form the contour surface 29 by removing the volume V to be removed. Thereby the laser beam impulses P are directed on the impact locations 27 within the pulse area 28 and, as appropriate, the pulse area 28 is moved along the surface 31 of the volume V to be removed. The size of the pulse area 28 can also correspond to the respective size of the surface 31 of the volume V to be removed and can be adapted in shape and dimension, if the shape and dimension of the surface 31 changes during the layer by layer removal. This removal of the volume V to be removed for creating the contour surface 29 is schematically illustrated in FIGS. 6 and 7.

Figures 9, 10:
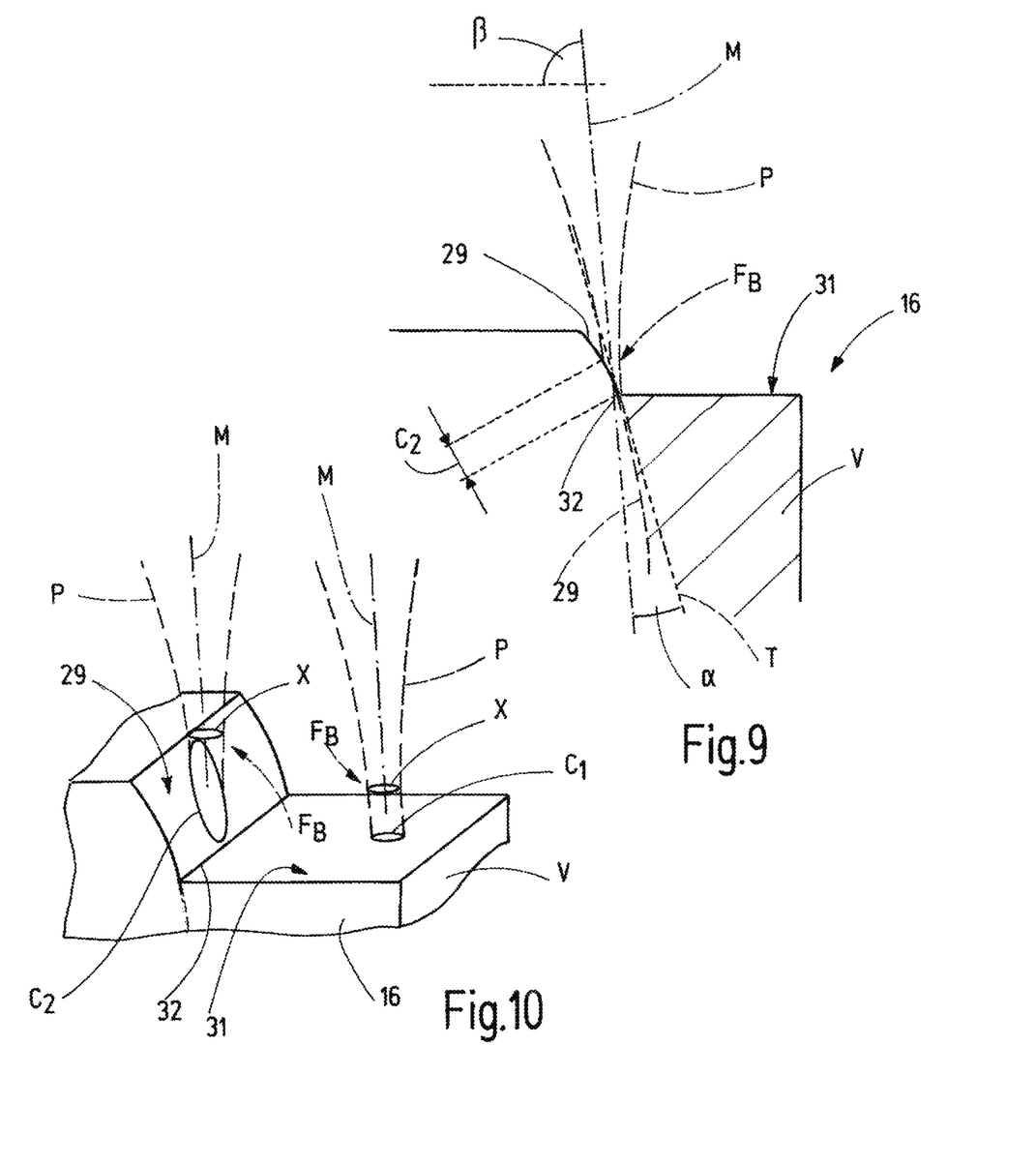

One location on the workpiece 16 at which the contour surface 29 to be created adjoins the surface 31 of the volume V to be removed is denoted as border location 32. Adjacent to this border location 32 of the contour surface 29 to be created the actual material removal layer is present at the surface 31 of the volume V to be removed. The adjustment of an impact angle $\alpha$ of the laser beam impulses P relative to the contour surface 29 to be created at the border location 32 is of importance. At this border location 32 the impact angle $\alpha$ is controlled by the angle between the center axis M of the laser beam impulses P and the contour surface 29 to be created in an open-loop or closed-loop manner. In general this is illustrated for a convex curved contour surface 29 in FIG. 9. At the border location 32 a tangent T is placed on the contour surface 29 to be created. The tangent T and the center axis M of the laser beam impulses P are located in a common radial plane of the center axis M, wherein this radial plane is orientated orthogonal to the contour surface 29 to be created at the border location 32. Relative to the surface 31 of the volume V to be removed, the center axis M has an angle $\alpha$ that is larger than the adjusted impact angle $\alpha$. The impact angle $\alpha$ is adjusted depending on the desired geometry of the contour surface 29 to be created at the observed border location 32 complying with the following condition:

The impact angle $\alpha$ is at most as large as a threshold angle $\alpha_S$ and at least as large as a minimum angle $\alpha_{min}$. The minimum angle $\alpha_{min}$ is remarkably larger than 0 degrees and preferably the amount of the difference $\alpha_S - \alpha_{min}$ between the threshold angle $\alpha_S$ and the minimum angle $\alpha_{min}$ is very small. Particularly the minimum angle $\alpha_{min}$ has at least an amount of 95% of the threshold angle $\alpha_S$. According to the example, the minimum angle $\alpha_{min}$ is equal to the threshold angle $\alpha_S$, such that the impact angle $\alpha$ is defined and adjusted (open-loop or closed-loop controlled) to be equal to the threshold angle $\alpha_S$.

The threshold angle $\alpha_S$ is the amount of the impact angle $\alpha$ at which an effective laser energy density $E_{eff}$ at the impact location 27 of the laser beam impulse P on the contour surface 29 to be created of the workpiece 16 is equal to the threshold fluence $F_S$. The effective laser energy density $E_{eff}$ is calculated by the pulse energy of the laser beam impulse P absorbed by the workpiece surface divided through an irradiated area of the impact location 27. If the effective laser energy density $E_{eff}$ is larger than a threshold fluence $F_S$, material is removed at the impact location 27. If the effective laser energy density $E_{eff}$ is smaller than the threshold fluence $F_S$, no material removal occurs at the impact location 27.

In other words in that the impact angle $\alpha$ relative to the contour surface 29 to be created is at most as large as the threshold angle $\alpha_S$ or preferably equal to the threshold angle $\alpha_S$, it is avoided that a material removal occurs on the desired geometry of the contour surface 29 to be created. The material removal only takes place on such volume elements of the volume V to be removed on which the effective laser energy density $E_{eff}$ is larger than the threshold fluence $F_S$. This is the case for all volume elements at the volume V to be removed that project obliquely or transverse from the desired geometry of the contour surface 29 to be created, because the impact angle $\alpha$ is adjusted near to or equal to the threshold angle $\alpha_S$. The control device 19 controls the emission of the laser beam impulses P or the orientation of the center axis M, such that a material removal of the volume V to be removed occurs so-to-speak automatically along the desired geometry of the contour surface 29 to be created.

Figure 8:
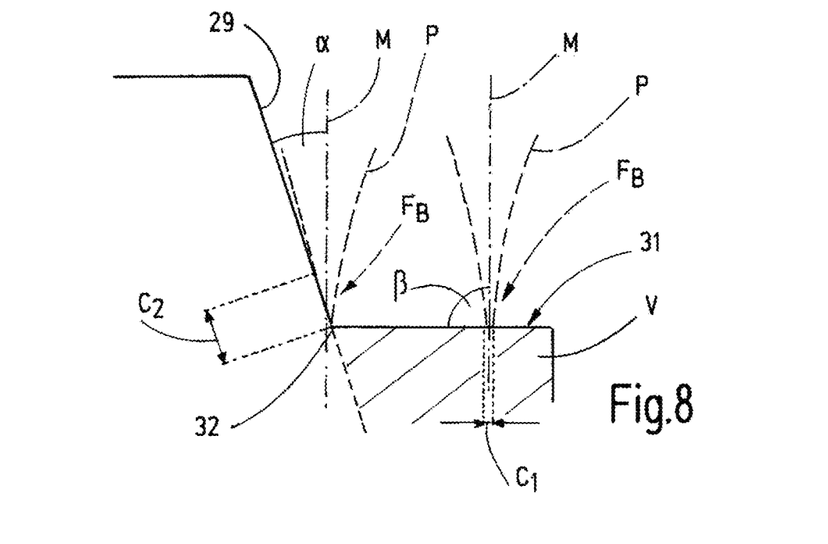

This principle is again schematically illustrated based on FIGS. 8 and 10. In the focus area $F_B$ a laser energy density $E_L$ is given as pulse energy of the laser beam impulse divided through a cross-section area X of the laser beam impulse P in the focus area $F_B$. If the center axis M is orientated orthogonal to the surface 31 of the volume V to be removed, the size of the cross-section area X of the laser beam impulse P in the focus area $F_B$ is approximately as large as a first irradiated surface $C_1$ on the surface 31 of the volume V to be removed. The effective laser energy density $E_{eff}$ then corresponds substantially to the laser energy density $E_L$.

By predefining the impact angle $\alpha$ at the border location 32 of the contour surface 29 to be created a second irradiated surface $C_2$ becomes so large at the location at which the surface 31 of the volume V to be removed transitions into the contour surface 29 to be created, such that the effective laser energy density $E_{eff}$ corresponds to the threshold fluence $F_S$ or is slightly smaller and thus no material removal occurs at the desired geometry of the contour surface 29 to be created. The second irradiated surface $C_2$ is larger than the cross-section area X of the laser beam impulses P in the focus area and the effective laser energy density $E_{eff}$ is thus smaller than the laser energy density $E_L$.

The invention refers to a method for material removal machining of a workpiece 16 by laser beam impulses P. The laser beam impulses P are directed on impact locations 27 on the surface 31 of a volume V of a workpiece 16 to be removed, in order to remove material from the volume V to be removed. By removing the volume V to be removed, a new contour surface 29 to be created is created on the workpiece 16. An impact angle $\alpha$ of the laser beam impulses P relative to the contour surface 29 to be created is adjusted according to a predefined condition during the removal of at least part of the volume V to be removed that directly adjoins the contour surface 29 to be created. According to this condition, the impact angle $\alpha$ is equal to a threshold angle $\alpha_S$ or slightly smaller. The threshold angle $\alpha_S$ corresponds to the impact angle at which an effective laser energy density $E_{eff}$ of the laser beam impulses P at the impact location 27 on the contour surface 29 to be created is equal to the threshold fluence $F_S$. A material removal at the impact location 27 only takes place, if the effective laser energy density $E_{eff}$ is larger than the threshold fluence $F_S$. In doing so, it can be achieved that only such volume elements of the volume V to be removed are removed that adjoin the desired contour surface 29 to be created. Thus, the desired contour surface 29 can be created on the workpiece 16 very precisely by open-loop or closed-loop control of the impact angle $\alpha$.

LIST OF REFERENCE SIGNS 15 laser processing machine
16 workpiece 17 laser
18 laser head
19 control device
22 clamping device
23 machine axis arrangement
24 machine axis
27 impact location
28 pulse area
29 contour surface
30 cutting edge
31 surface of the volume to be removed
32 border location
α impact angle
$α_{min}$ minimum angle
$α_S$ threshold angle
β angle
A optical axis
B pulse path
$F_B$ focus area
$C_1$ first irradiated surface
$C_2$ second irradiated surface
DX rotary degree of freedom around X-axis
DY rotary degree of freedom around Y-axis
DZ rotary degree of freedom around Z-axis
$E_L$ laser energy density
$E_{eff}$ effective laser energy density
$F_S$ threshold fluence
M center axis of laser beam impulses
P laser beam impulse
T tangent
V volume to be removed
X translatory degree of freedom along X-axis
Y translatory degree of freedom along Y-axis
Z translatory degree of freedom along Z-axis

The invention claimed is:

1. A method for material removal laser machining of a workpiece under use of a laser processing machine having a laser creating laser beam impulses, having a laser head that directs the laser beam impulses of the laser on the workpiece and having a machine axis arrangement comprising at least one machine axis that is configured to position and/or move the workpiece and the laser head in at least one translatory and/or rotatory degree of freedom relative to each other, comprising the following steps:

emitting multiple laser beam impulses by means of the laser head on a surface of a volume to be removed of the workpiece, wherein material is removed from the volume to be removed of the workpiece and thus a contour surface to be created is created on the workpiece, adjusting an impact angle of the laser beam impulses relative to the contour surface to be created at a border location at which the contour surface to be created directly adjoins the volume to be removed such that the impact angle is at most as large as a threshold angle and is at least as large as a minimum angle, wherein the minimum angle is larger than 0 degrees and the threshold angle is equal to an amount of the impact angle at which an effective laser energy density at an impact location of the laser beam impulses on the contour surface to be created of the workpiece corresponds to a threshold fluence, wherein an effective laser energy density that is larger than the threshold fluence effectuates a material removal at the impact location and an effective laser energy density that is smaller than the threshold fluence does not effectuate material removal at the impact location, wherein a desired geometry of the contour surface to be created at the border location that directly adjoins an uppermost layer of a volume to be removed is used as a parameter for determination of the impact angle so that only volume elements of the volume to be removed and that projects beyond the desired geometry of the contour surface are effectively removed.

2. The method according to claim 1, wherein the impact angle is an angle between a tangent at the border location of the contour surface to be created and a center axis of the laser beam impulses and/or an optical axis of the laser head.

3. The method according to claim 1, wherein the impact angle of the laser beam impulses is adjusted relative to the contour surface to be created at the border location such that it is equal to the threshold angle.

4. The method according to claim 1, wherein the adjusting of the impact angle is executed by positioning and/or orientating the workpiece and the laser head relative to each other.

5. The method according to claim 1, wherein the effective laser energy density of the laser beam impulses is defined as a pulse energy of the laser beam impulses absorbed by the workpiece divided through a cross-section area of the laser beam impulses, wherein the effective laser energy density is always larger than the threshold fluence during the laser machining of the workpiece.

6. The method according to claim 1, wherein the laser beam impulses are directed on impact locations that are arranged within a pulse area.

7. The method according to claim 6, wherein a size and a shape of the pulse area and/or the position of the impact locations within the pulse area are defined depending on one or more parameters of the workpiece and/or the contour surface to be created.

8. The method according to claim 6, wherein the laser beam impulses are emitted from the laser head in a predefined sequence on the impact locations within the pulse area.

9. The method according to claim 6, wherein an outer contour of the pulse area is varied depending on the actual relative position and/or relative orientation of the workpiece relative to the laser head.

10. The method according to claim 1, wherein an impulse duration of the laser beam impulses is in a nanosecond, picosecond or femtosecond range.

11. The method according to claim 1, wherein the method is used during manufacturing of a tool made from the workpiece.

12. The method according to claim 1, wherein the contour surface to be created is a rake surface or flank adjoining a cutting edge.

13. The method according to claim 2, wherein the impact angle of the laser beam impulses is adjusted relative to the contour surface to be created at the border location such that it is equal to the threshold angle.

14. The method according to claim 13, wherein the adjusting of the impact angle is executed by positioning and/or orientating the workpiece and the laser head relative to each other.

15. The method according to claim 14, wherein the effective laser energy density of the laser beam impulses is defined as a pulse energy of the laser beam impulses absorbed by the workpiece divided through a cross-section area of the laser beam impulses, wherein the effective laser energy density is always larger than the threshold fluence during the laser machining of the workpiece.

16. The method according to claim 15, wherein the laser beam impulses are directed on impact locations that are arranged within a pulse area.

17. The method according to claim 16, wherein a size and a shape of the pulse area and/or the position of the impact locations within the pulse area are defined depending on one or more parameters of the workpiece and/or the contour surface to be created.

18. The method according to claim 17, wherein the laser beam impulses are emitted from the laser head in a predefined sequence on the impact locations within the pulse area.

19. The method according to claim 18, wherein an outer contour of the pulse area is varied depending on the actual relative position and/or relative orientation of the workpiece relative to the laser head.

20. The method according to claim 19, wherein an impulse duration of the laser beam impulses is in a nanosecond, picosecond or femtosecond range.

* * * * *